May 25, 1948.   E. M. DELORAINE ET AL   2,441,956
RADIO GUIDING METHOD AND SYSTEM
Filed Aug. 28, 1942   2 Sheets-Sheet 1

INVENTORS
EDMOND M. DELORAINE
EMILE LABIN
BY
ATTORNEY

May 25, 1948.   E. M. DELORAINE ET AL   2,441,956
RADIO GUIDING METHOD AND SYSTEM
Filed Aug. 28, 1942   2 Sheets—Sheet 2

TIME INTERVAL BETWEEN RECEIVED PULSES

INVENTORS
EDMOND M. DELORAINE
EMILE LABIN
BY
ATTORNEY

Patented May 25, 1948

2,441,956

UNITED STATES PATENT OFFICE 2,441,956

RADIO GUIDING METHOD AND SYSTEM

Edmond M. Deloraine and Emile Labin, New York, N. Y., assignors to Federal Telephone and Radio Corporation, a corporation of Delaware Application August 28, 1942, Serial No. 456,500

4 Claims. (Cl. 343—15)

This invention relates to radio guiding methods and systems and more particularly to a radio guiding system wherein the course is defined by means of a pair of spaced repeater systems brought into operation by transmissions from the aircraft.

A system has been proposed wherein the guiding of an aircraft is effected by means of widely spaced transmitting arrangements operating with pulse modulation. The pulses from the transmitters are received on an aircraft and by comparison of the harmonics produced therein the location of the craft with respect to a particular course is indicated. This proposed system is fully described in the U. S. Patent 2,407,287 to Emile Labin, granted September 10, 1946, entitled "Course beacon."

The present invention contemplates the use of a similar principle for guiding an aircraft but constitutes a more sensitive indicating system.

It is a principal object of our invention to provide a simplified highly sensitive course indicating system.

It is a further object of our invention to provide a sensitive course indicating system which may utilize the normal pulse transmission and receiver equipment installed for regular communication.

It is a still further object of our invention to provide a distance indicator on the aircraft as well as a sensitive course indicating arrangement. According to our invention instead of providing transmitters at the widely spaced points as in the above referred to system repeater stations are erected. The repeaters are excited by pulse transmissions from the ordinary communication pulse transmitter on the aircraft and repeat the signal to the aircraft where it is received for indication of the course position. This arrangement provides twice the sensitivity of the previously proposed arrangement since upon a deviation from the course the impulses received on the craft will have twice the relative displacement they would have if the signals were transmitted from the ground stations instead of being repeated.

With the repeater system outlined above, it is necessary to prevent the repeaters from triggering one another into operation so that a singing or sustained oscillation occurs in the system. For this purpose the positioning and blocking of the equipment at the fixed ground stations may be adjusted to overcome any tendency to sing. Alternatively, the antenna systems may be provided with such directional effects that they do not materially radiate to one another.

A better understanding of our invention and the objects and features thereof may be had from the particular description made with reference to the accompanying drawings in which:

Fig. 3 is a circuit diagram of the course indicator provided on the aircraft; and Fig. 4 is a set of curves used in describing the operation of the indicator of Fig. 3.

Figure 1:
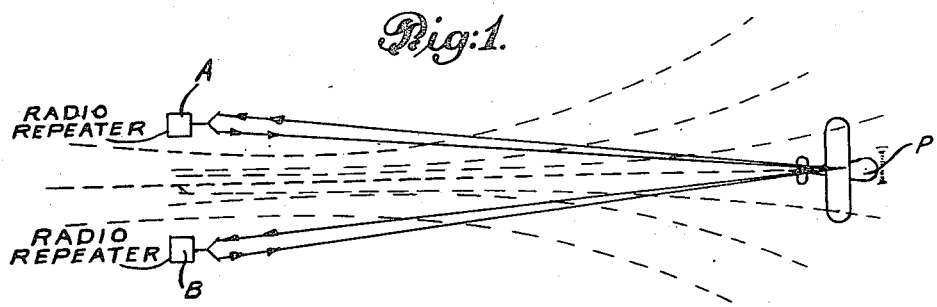
Fig. 1 is a diagrammatic field layout indicating the general operation of the system.

In Fig. 1 is shown a plane P provided with pulse transmitting and receiving equipment and in addition the desired course indicator and distance indicating equipment as well as the normal two-way speech channel equipment. Preferably, this apparatus on the airplane constitutes a normally used time modulation pulse transmitter and receiver with the time modulation detector equipment for communication in the regular way and in addition a blocking amplifier arrangement operating in timed relation with the transmitter to block the receiver against reception of pulses transmitted from the craft itself. Pulses transmitted from P are received at two spaced substantially fixed stations A and B. Stations A and B are repeater equipments which repeat the pulses received from P back so that they are received again on the craft. Preferably, one of the stations, for example station B, has a delaying network to delay the transmission for a predetermined interval so that when the craft is on course as shown in Fig. 1 the repeated impulses from B will arrive at P a predetermined time behind those from repeater A. Because of the two way travel of the waves a sensitivity of twice that obtained without reflection is obtained.

Figure 2:
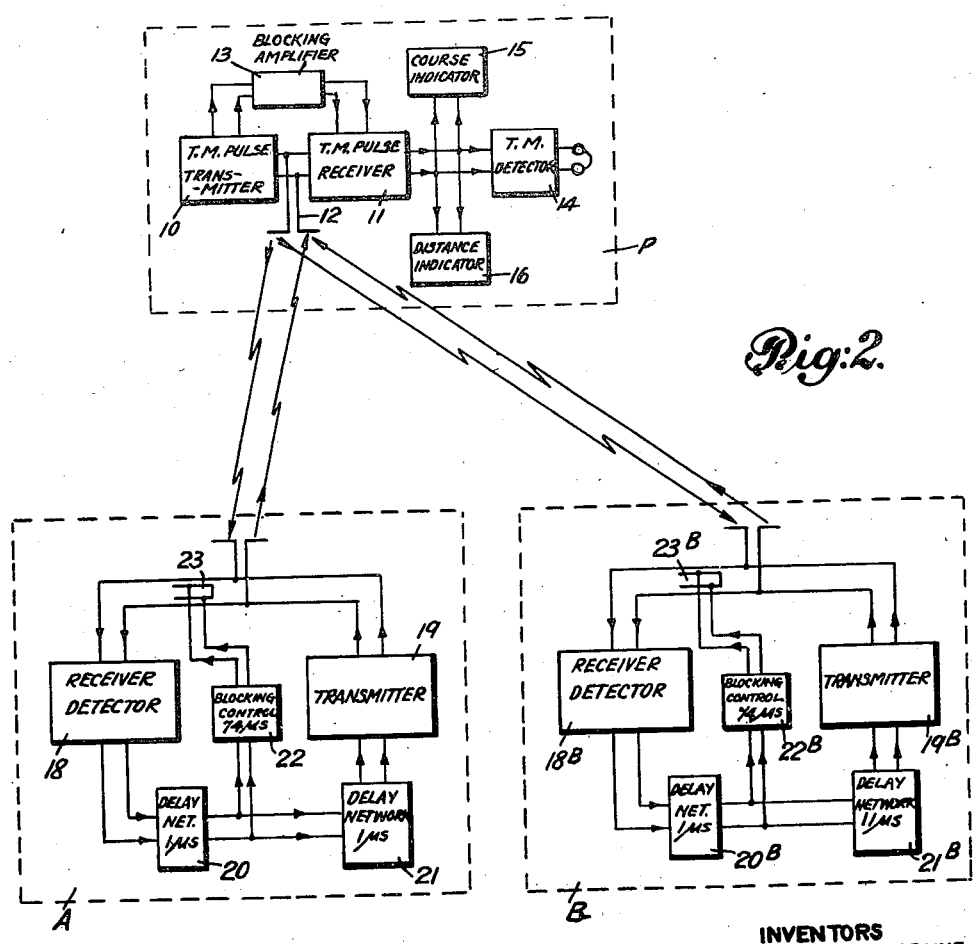
Fig. 2 is a diagrammatic circuit layout of the equipment provided on the aircraft and at the ground stations.

Turning to Fig. 2 a more detailed description of the equipment involved at stations P, A and B is shown. At P is provided the time modulated pulse transmitter 10 and receiver 11 coupled to the transmitting receiving antenna 12. This time modulated pulse system is referably of the type shown in the prior art described, in U. S. Patents 2,256,336, 2,265,337, 2,266,401 or in the copending applications of Emile Labin 386,282 and 449,595, filed April 1, 1941, and July 3, 1942, now Patents 2,406,019 and 2,416,328, issued August 20, 1946, and February 25, 1947, respectively. For the purposes of the present invention, however, some additional equipment is necessary in order that course and distance indications may be obtained. Accordingly, a blocking circuit including blocking amplifier 13 is connected from transmitter 10 to receiver 11. This blocking amplifier is necessary in order that distance indication signals may be received at the proper time intervals between transmitted pulses. It is clear that the ordinary push-to-talk controls provided in a simple communication equipment cannot operate with sufficient rapidity for the purpose of distance determinations. Furthermore, even for normal course indications, it is desirable to have blocking circuits provided so that the receiver is blocked in response to operation of the transmitter.

The output of time modulated pulse receiver 11 feeds to the normal time modulation detector 14, the distance indicator apparatus 16, which serves to provide the distance indications on the craft by the reflection method and the course indicator which is described in more detail later. Complete description of the distance indicator is not incorporated herein since the general type of system is well known. This indicator may include a detector for rectifying the received impulses and a cathode ray indicator for indicating the time of arrival of the repeated pulses to indicate the distance of the craft from the transmitting station. Preferably, the first received pulse is utilized for the purpose of distance indication since this will generally be a more accurate indication than will be obtained by the later received pulses. This type of distance indicator is quite commonly used and may be one such as illustrated in the H. G. Busignies application, Serial No. 382,390, filed March 8, 1941, entitled "Impulse translating system," and in the Roy C. Hopgood application, Serial No. 435,873, filed March 23, 1942, entitled "Instrument navigation system," now Patent No. 2,426,218, issued August 26, 1947.

Repeater station A is provided with a receiver detector unit 18 and a transmitter 19. The pulses received from P are delayed a short period of time, for example, about two microseconds before they are transmitted from 19. Delay networks 20 and 21 indicate the delay in retransmission involved and may represent the inherent delay in the system instead of separate networks. Since the impulses themselves are generally less than two microseconds in width and are spaced quite widely, say about 80 microseconds apart, this delay permits a retransmission of the signals without necessitating the provision of any hybrid coils or other conjugate networks. The receiver equipment 18 is blocked from operation before the transmitter is keyed into operation. The blocking control circuit is shown at 22 and is coupled to a blocking network 23 which may be in a form of a coupled section provided with a shunted vacuum tube arrangement so as to block transmission of energy to the receiver from transmitter 19 or any signals received on the antenna of the equipment. This type of blocking circuit is preferable to simple blocking of the receiver since it also protects the receiver from high voltage surges of transmitter 19. Such a blocking network is disclosed more fully in the copending application of Ross B. Hoffman, Serial No. 418,671, filed November 12, 1941, entitled "Antenna switching devices," now Patent No. 2,402,625, issued June 25, 1946. The blocking control arrangement 22 preferably is of the multivibrator type and serves to maintain the receiver block for a period of time greater than the traverse time of signals between stations A and B. In the specific example to be described this may be 74 microseconds so that receiver 18 is blocked until 75 microseconds after the arrival of the received signals.

The repeater arrangement B is generally similar to that of repeater A and the corresponding elements thereof are given the same reference characters with the letter B following. Thus, the signals are received on receiver detector 18B delayed for a period by delay networks 20B, 21B before transmission from transmitter 19B and receiver detector 18B is blocked under the control of blocking circuit including multivibrator 22B and network 23B. In the case of repeater B, however, an additional delay in the transmission of the pulse is provided to assure that the impulses received on the airplane while it is on course are spaced a predetermined distance. As shown in this example, the delay network 21B serves to produce an added delay of 10 microseconds as well as the normal 1 microsecond delay.

The particular example given below describes a repeater system which will avoid repeating back and forth of the signal between A and B. The pulses from P are spaced apart in time an average of 80 microseconds, stations A and B are spaced apart such a distance that the traversal time between the stations is 30 microseconds. This will correspond to about 5.6 miles spacing. It can be seen that with this set-up and the delay times indicated in Fig. 2 even under the worst conditions, the impulses repeated from either station after receipt from P cannot falsely trigger the other station. Also should station A be accidentally triggered without station B receiving any signal the blocking of the receiver for a period of 75 microseconds is sufficient to prevent signals repeated from B operating repeater A again.

While a specific example is given herein, it is clear that this is not the only example wherein singing will not occur in the repeater equipments. If no additional precautions are taken, the following general rules may be observed. The spacing between the repeater stations should be such that the traversal time between them is less than half of the period T between the transmitted pulses. Because of the added delay in network 21B this spacing should be a little less than that which would produce a traversal time equal to ½ (T—D) where T is the period of the pulses and D is the delay time of network 21B. The blocking condition of the receiver is arranged to persist for a time $T_b$ which is preferably shorter than the period T by an amount sufficient to permit slight shiftings of the pulse position so as not to interfere with the speech-controlled time modulation of the system. Also, both repeaters should have a sufficient delay between the time of reception of an impulse before transmission takes place.

While it is preferable to have repeater stations which are omni-directional, it is possible to use directional antenna instead of the more elaborate blocking system and position the antenna of the repeater stations so they will not radiate sufficient energy toward one another to operate each other. With this type of construction, the additional precautions with respect to the spacing and timing of the circuits need not be taken.

The course indicator 15 of Fig. 2 is shown in more detail in Fig. 3 and in this arrangement the pulses from the output of receiver 11 are applied over a limiter 30 to a detector 31 and from there to suitable filter detector circuits 32, 33, 35, 37 and 39 which serve to separate the fourth, third, fifth, seventh and ninth harmonics of the received pulses. This equipment is substantially similar to that disclosed in the aforementioned application of Emile Labin, Serial No. 400,259, filed June 28, 1941, entitled "Course beacon," now Patent No. 2,407,287, issued September 10, 1946. As disclosed in that application, the received impulses if spaced zero time interval apart can be shown to be composed of a plurality of harmonics all of which are substantially equal in amplitude. Theoretically, if the pulses are infinitely sharp, they contain all of the harmonics in equal amplitude. In practice, it has been found that the harmonics below about the thirteenth in the extremely short impulses, of two microseconds or less, are substantially equal in strength. Thus, these higher harmonics as well as the lower harmonics may be used in a comparison circuit for determining course position.

In the specific example given with the spacing between the repeaters in the order of less than half the period T of the impulses, the second harmonic cannot readily be used as the basis of comparison. Accordingly, in Fig. 4, we have shown a set of curves utilizing the fourth harmonic 4T as the base of course indications. This fourth indication comes to zero for a pulse separation of T/8. Along this line, as can be seen in Fig. 4, the third and fifth harmonics indicated by curves 3T and 5T intersect as do the seventh and ninth harmonics indicated in curves 7T and 9T. Accordingly, the meter 40 and the output of filter 32 may be used to indicate the course position in combination with meters 41 and 42 in the output of filters 33, 35 and 37, 39 respectively. Other higher harmonics may be used as desired if sharper course indications are wished.

When the fourth harmonic 4T is used as the course indication base (the pulse repeaters being arranged to delay one pulse by an interval of T/8 with respect to the other pulse) the other harmonics may be compared in the manner described. The harmonics which may be expressed by 8N−5 will come to equality with those expressed by the formula 8N−3 (when N=any integer) whenever the interval between pulses is T/8. The point at which these harmonics reach equality is shown at 50 in Fig. 4. Another set of harmonics which may be defined by 8N−1 and 8N+1 intersect equally for a pulse interval of T/8 as shown at point 51 of Fig. 4. All of these odd harmonics reach equality at 52 which corresponds to a time interval of T/4 between pulses in Fig. 4. For convenience and simplification of illustration only the harmonics corresponding to the third, fourth, fifth, seventh and ninth have been illustrated in the drawing. It sould be understood, however, that any of the sets of harmonics outlined by the formulae set out above may be used. It is clear that a course is given by the null position of the fourth harmonic. However, this course does not give any indication of the direction of departure therefrom. Furthermore, sharpening may be obtained by comparison of some of the higher harmonics.

While we have described a particular embodiment of our invention, it is clear that many alterations in the system and method may occur to those skilled in the art without departure from the scope of our invention. Also many other types of equipment than that illustrated might be provided if desired.

What is claimed is:

1. A radio guiding system for movable craft, said craft comprising a pulse transmitter and a pulse receiver, said pulse transmitter transmitting pulses having a given pulse recurrence rate on a given carrier frequency, retransmitting stations arranged at widely spaced, relatively fixed points, each of said retransmitting stations comprising a receiver for receiving said transmitted pulses, means at each of said retransmitting stations for delaying said received pulses for different time intervals, pulse transmitters at each of said retransmitting stations for transmitting said delayed pulses at said given carrier frequency, said craft receiver receiving said transmitted delayed pulses, a course indicator on said craft responsive to the time spaced relationship of said received delayed pulses for indicating the course position of a craft, said distance indicator on said craft responsive to the time interval between said first-named pulse transmission and the reception of a corresponding one of said received delayed pulses for indicating the distance from said craft to the respective transmitter of said corresponding delayed pulse.

2. The method of obtaining guiding signals on a craft, provided with a pulse transmitter and a receiver, with respect to two spaced transmission points comprising transmitting a pulse signal train of a given pulse repetition rate from said pulse transmitter on a given carrier frequency, receiving said transmitted pulse signal train at said spaced transmission points, delaying said received pulse signal train at each of said transmission points for different time intervals for providing a predetermined subsequent transmitted delayed pulse radiation pattern, transmitting said delayed pulse signals from said spaced transmission points on said given carrier frequency in response to receipt of said transmitted pulse signals after said delay, receiving said delayed pulse signal trains on said craft and analyzing the frequency components of the pulses of the received delayed pulse signal trains to determine the course position of said craft.

3. The method of obtaining guiding signals on a craft provided with a pulse transmitter and a receiver with respect to a pair of spaced transmission points comprising transmitting a pulse signal train of a given repetition rate from said pulse transmitter, receiving said transmitted pulse signal train at said spaced transmission points, delaying said received pulse signal trains at each of said transmission points for different time intervals for providing a predetermined subsequent transmitted delayed pulse radiation pattern, transmitting said delayed pulse signals from said spaced transmission points in response to receipt of said transmitted pulse signal after said delay, blocking further reception of pulse signals at said spaced transmission points in response to receipt of said transmitted pulse signal for a predetermined time interval greater than the radiation traverse time between said spaced points, receiving said delayed pulses on said craft and analyzing the frequency components of the pulses of the received delayed pulse signal trains to determine the course position of said craft.

4. A radio navigation system for obtaining guiding signals on a craft with respect to a pair of spaced transmission points, comprising means for transmitting a pulse signal train of a given pulse repetition rate from said craft, each of said transmission points comprising means for receiving said transmitted pulse signals, means for delaying each of said received pulse signals for different time intervals to provide a predetermined subsequent transmitted delayed pulse radiation pattern, means for transmitting said delayed pulses from said spaced transmission points in response to receipt of said transmitted pulse signals after said delay, means at each of said spaced transmission points for blocking said means for receiving transmitted pulses for a given time interval greater than the radiation traverse time between said spaced points in response to the reception of a transmitted pulse signal, means on said craft for receiving said transmitted delayed pulse trains and means for analyzing the frequency components of the transmitted delayed pulse signal trains to determine the course position of said craft.

EDMOND M. DELORAINE.
EMILE LABIN.

REFERENCES CITED

The following references are of record in the file of this patent:

UNITED STATES PATENTS

| Number | Name | Date |
|---|---|---|
| 2,134,716 | Gunn | Nov. 1, 1938 |
| 2,296,041 | Luck | Sept. 15, 1942 |
| 2,301,929 | Budenbom | Nov. 17, 1942 |
| 2,405,238 | Seeley | Aug. 6, 1946 |
| 2,407,287 | Labin | Sept. 10, 1946 |

FOREIGN PATENTS

| Number | Country | Date |
|---|---|---|
| 116,666 | Australia | Oct. 10, 1941 |
| 116,667 | Australia | Oct. 10, 1941 |